United States Patent
Senzaki et al.

(10) Patent No.: US 11,279,833 B2
(45) Date of Patent: Mar. 22, 2022

(54) SURFACE TREATMENT LIQUID AND SURFACE TREATMENT METHOD

(71) Applicant: TOKYO OHKA KOGYO CO., LTD., Kanagawa (JP)

(72) Inventors: Takahiro Senzaki, Kanagawa (JP); Takuya Noguchi, Kanagawa (JP); Takashi Ohsaka, Kawasaki (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 0 days.

(21) Appl. No.: 16/495,249

(22) PCT Filed: Feb. 2, 2018

(86) PCT No.: PCT/JP2018/003682
§ 371 (c)(1),
(2) Date: Sep. 18, 2019

(87) PCT Pub. No.: WO2018/173508
PCT Pub. Date: Sep. 27, 2018

(65) Prior Publication Data
US 2020/0010689 A1   Jan. 9, 2020

(30) Foreign Application Priority Data
Mar. 23, 2017 (JP) .............................. JP2017-058287

(51) Int. Cl.
| C09D 5/00 | (2006.01) |
| C09D 133/16 | (2006.01) |
| C09D 143/04 | (2006.01) |
| C09D 133/26 | (2006.01) |

(52) U.S. Cl.
CPC ............ *C09D 5/00* (2013.01); *C09D 133/16* (2013.01); *C09D 133/26* (2013.01); *C09D 143/04* (2013.01)

(58) Field of Classification Search
CPC ........................... C09D 133/26; C09D 201/02
See application file for complete search history.

(56) References Cited

U.S. PATENT DOCUMENTS

| 6,200,672 | B1 * | 3/2001 | Tadokoro | ............... | C09D 5/086 |
| | | | | | 106/14.12 |
| 10,119,119 | B2 * | 11/2018 | Feinberg | ............. | C12N 5/0068 |
| 2006/0240438 | A1 * | 10/2006 | Nagasaki | ......... | G01N 33/54366 |
| | | | | | 435/6.19 |
| 2012/0097882 | A1 * | 4/2012 | Otozawa | ............. | D06M 15/277 |
| | | | | | 252/8.62 |
| 2015/0378257 | A1 | 12/2015 | Yamaguchi et al. | | |
| 2016/0340540 | A1 | 11/2016 | Brust et al. | | |
| 2017/0335266 | A1 | 11/2017 | Noda et al. | | |
| 2018/0223024 | A1 * | 8/2018 | Hyuugaji | ................ | A61L 31/10 |

FOREIGN PATENT DOCUMENTS

| EP | 2703466 A4 * | 11/2014 | ............... C09D 5/00 |
| EP | 2 886 614 | 6/2015 | |
| EP | 3 178 857 | 6/2017 | |
| EP | 3 216 856 | 9/2017 | |
| JP | 4665762 | 4/2011 | |
| JP | 5437523 | 3/2014 | |
| JP | 2017-196351 | 11/2017 | |
| WO | 2010/140668 | 12/2010 | |
| WO | 2016/072369 | 5/2016 | |
| WO | 2017/022815 | 2/2017 | |
| WO | WO-2017022815 A1 * | 2/2017 | ............. A61L 31/10 |

OTHER PUBLICATIONS

International Search Report dated Mar. 6, 2018 in International (PCT) Application No. PCT/JP2018/003682.
Partial Supplementary European Search Report dated Mar. 15, 2021 in corresponding European Patent Application No. 18771041.3.

* cited by examiner

*Primary Examiner* — Cachet I Proctor

(74) *Attorney, Agent, or Firm* — Wenderoth, Lind & Ponack, L.L.P.

(57) ABSTRACT

The purpose of the present invention is to provide: a surface treatment liquid that is capable of favorably hydrophilizing or hydrophobing surfaces of an object to be treated without having to include a film forming resin; and a surface treatment method using the surface treatment liquid. The present invention provides a surface treatment liquid which comprises (A) a resin and (C) a solvent, wherein as (A) the resin, a resin is used which has a weight average molecular weight of 100000 or more and contains a functional group I which comprises one group or more selected from the group consisting of a hydroxyl group, a cyano group, and a carboxyl group, and a functional group II which is a hydrophilic group or a hydrophobic group other than the functional group I.

15 Claims, No Drawings

SURFACE TREATMENT LIQUID AND SURFACE TREATMENT METHOD

TECHNICAL FIELD

The present invention relates to a surface treatment liquid, and a surface treatment method using the surface treatment liquid.

BACKGROUND ART

Conventionally, in order to perform surface-treatment for modifying properties of surfaces of various types of articles, various surface treatment liquids have been used. For example, among surface modification, there are many demands for making the surfaces of articles hydrophilic or hydrophobic. Many surface treatment processes using agents and surface treatment liquids for making the surfaces of articles hydrophilic or hydrophobic have been proposed in Patent Document 1 etc. Furthermore, for the purpose of suppressing adsorption of non-specific protein on the surface of a biosensor, or contamination on the surface of a medical device, and the like, surface treatment for suppressing adsorption of protein and the like to the surface of a treatment target has been demanded. A surface treating agent to be used for such surface treatment is proposed in, for example, Patent Document 2.

For such agents for surface treatment to be used for surface treatment to be carried out for the purposes mentioned above, for example, as a surface conditioner capable of imparting a hydrophilic property and an antifouling property to a coating film surface, a copolymer having a weight-average molecular weight of 1500 to 50000 in which at least an acrylamide monomer and a siloxy group-containing mono(meth)acrylate monomer having a specific skeleton are copolymerized has been proposed (Patent Document 1).

Patent Document 1: Japanese Patent No. 5437523
Patent Document 2: Japanese Patent No. 4665762

DISCLOSURE OF THE INVENTION

Problems to be Solved by the Invention

However, when a surface is treated to be hydrophilic by using the surface conditioner disclosed in Patent Document 1, even when a surface of a treatment target is treated with a solution including only the surface conditioner, the surface conditioner is not easily attached to the surface of the treatment target. As a result, a desired hydrophilic effect cannot easily be obtained. Therefore, Patent Document 1 uses a solution as a surface treatment liquid obtained by blending a solution of a surface conditioner with resin such as acrylic resin, polyester resin, urethane resin, alkyd resin, epoxy resin, and polyamine resin, as a coating film formation component.

Further, when a surface treatment liquid including the surface conditioner and a coating film formation component disclosed in Patent Document 1 is used, the surface of the treatment target is covered with a coating film including resin. Therefore, the surface can be successfully made hydrophilic, however useful surface properties of the treatment target are damaged in the process.

The present invention has been made considering the above-mentioned problems, and has an object to provide a surface treatment liquid capable of successfully making a surface of a treatment target hydrophilic or hydrophobic even without including a coating film-formation resin, and a surface treatment method using such a surface treatment liquid.

Means for Solving the Problems

The present inventors have found that the above-mentioned problems can be solved when in a surface treatment liquid including (A) a resin and (C) a solvent, a resin having a functional group I which is a group having a weight-average molecular weight of 100,000 or more and is one or more groups selected from the group consisting of a hydroxyl group, a cyano group, and a carboxyl group, and a functional group II which is a hydrophilic group or a hydrophobic group other than the functional group I, is used as (A) the resin, thereby arriving at completion of the present invention.

A first aspect of the present invention is a surface treatment liquid including (A) a resin, and (C) a solvent, wherein (A) the resin includes a functional group I which is one or more groups selected from the group consisting of a hydroxyl group, a cyano group, and a carboxyl group, and a functional group II being a hydrophilic group or a hydrophobic group other than the functional group I; when the functional group II includes one or more groups selected from a hydroxyl group, a cyano group, and a carboxyl group, (A) the resin may not include the functional group I; and (A) the resin has a weight-average molecular weight of 100,000 or more.

A second aspect of the present invention is a surface treatment method including applying the surface treatment liquid according to the first aspect to a surface of a treatment target.

Effects of the Invention

The present invention can provide a surface treatment liquid capable of successfully making a surface of a treatment target hydrophilic or hydrophobic even without including resin having a coating film formation property, and provide a surface treatment method using such a surface treatment liquid.

PREFERRED MODE FOR CARRYING OUT THE INVENTION

<<Surface Treatment Liquid>>

A surface treatment liquid (hereinafter, also simply referred to as "treatment liquid") includes (A) a resin and (C) a solvent. (A) The resin includes a functional group I which is one or more groups selected from the group consisting of a hydroxyl group, a cyano group, and a carboxyl group, and a functional group II which is a hydrophilic group or a hydrophobic group other than the functional group I. Note here that when the functional group II includes at least one or more groups selected from a hydroxyl group, a cyano group, and a carboxyl group, (A) the resin may not include a functional group I. Furthermore, the surface treatment liquid may include (B) a strong acid, (B) The strong acid had pKa of 1 or less.

When the treatment liquid includes (A) a resin having a weight-average molecular weight of 100,000 or more and having a functional group I, at the time of surface treatment, (A) the resin is successfully bonded or attached to the surface of the treatment target. Accordingly, the hydrophilic or hydrophobic functional group II of (A) the resin is introduced into the surface of the treatment target with high efficiency. As a result, when the surface treatment is carried out using treatment liquid including (A) the resin which satisfies the aforementioned conditions, the surface of the treatment target is highly made to be hydrophilic or hydrophobic.

Hereinafter, essential or optional components included in the treatment liquid are described.

<(A) Resin>

(A) A resin includes a functional group I which is one or more groups selected from the group consisting of a hydroxyl group, a cyano group, and a carboxyl group. Furthermore, (A) the resin has a weight-average molecular weight of 100,000 or more. When (A) the resin having such a molecular weight is used, at the time of treatment with treatment liquid, by the reaction or interaction between the functional group I and the surface of the treatment target, (A) the resin is easily bonded or attached to the surface of the treatment target.

The weight-average molecular weight of (A) the resin is preferably 200,000 or more, and more preferably 300,000 or more from the viewpoint that the surface treatment effect is good. The weight-average molecular weight of (A) the resin may be 1,000,000 or more as long as (A) the resin is soluble in (C) the solvent to be mentioned below. The upper limit of the weight-average molecular weight of (A) the resin is not particularly limited as long as (A) the resin is soluble in (C) the solvent. The weight-average molecular weight of (A) the resin may be, for example, 2,500,000 or less, and 4,000,000 or less.

(A) The resin includes a functional group II which is a hydrophilic group or a hydrophobic group other than the functional group I. When a treatment liquid including a (A) resin having a hydrophilic group is used, treatment for making hydrophilic can be carried out. When a treatment liquid including a (A) resin having a hydrophobic group is used, treatment for making hydrophobic can be carried out. The hydrophilic group or the hydrophobic group is not particularly limited as long as it is functional groups that have conventionally been recognized as hydrophilic groups or hydrophobic groups by a person skilled in the art, and can be appropriately selected from them.

Types of (A) the resin are not particularly limited as long as (A) the resin has a predetermined functional group, and is soluble in (C) the solvent. Examples of (A) the resin include a (meth)acrylic resin, a novolac resin, a polyester resin, a polyimide resin, a polyimide resin, a polyamide-imide resin, a silicone resin, and the like. Among such resins, a (meth)acrylic resin is preferable because of easiness in insertion of a functional group, and adjustment of the content ratio of units each having a functional group.

Specific examples of the hydrophilic group include a polyoxyalkylene group (for example, a polyoxyethylene group, a polyoxypropylene group, a polyoxyalkylene group in which an oxyethylene group is block-bonded or randomly-bonded to an oxypropylene group, and the like), an amino group, a carboxyl group, a hydroxyl group, a sulfonic acid group, and the like. Furthermore, an organic group including these groups is preferable as the hydrophilic group.

When (A) the resin has a hydrophilic group or a hydrophobic group including a hydroxyl group, a cyano group, and a carboxyl group as the functional group II, the hydroxyl group, the cyano group, or the carboxyl group included in the hydrophilic group or the hydrophobic group also serves as the functional group I Therefore, when (A) the resin has a hydrophilic group or a hydrophobic group including a hydroxyl group, a cyano group, and a carboxyl group as the functional group II, (A) the resin may not have the functional group I. Note here that the hydrophilic group including a hydroxyl group and a carboxyl group includes the hydroxyl group itself and the carboxyl group itself.

From the viewpoint that a treatment liquid has excellent hydrophilic effect, as the hydrophilic group, a group represented by the following formula (A1):

$$-NH-R^1 \qquad (A1)$$

(in the formula (A1), $R^1$ represents an alkyl group having 1 to 4 carbon atoms substituted with one or more groups selected from the group consisting of an amino group, a sulfonic acid group and a hydroxyl group, or a hydrogen atom) is preferable.

Specific examples of the hydrophilic group represented by formula (A1) include an amino group and groups having $R^1$, represented by the following formulae.

[Chem. 1]

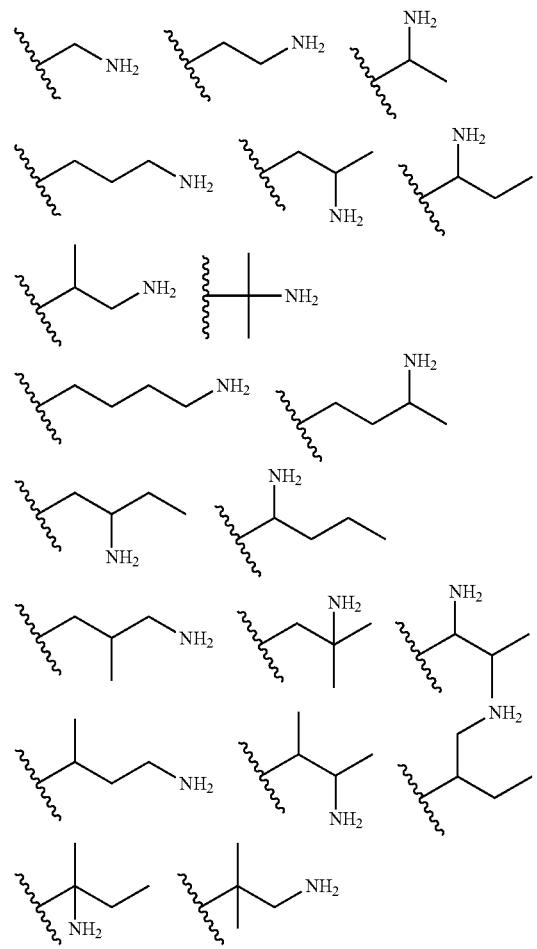

[Chem. 2]

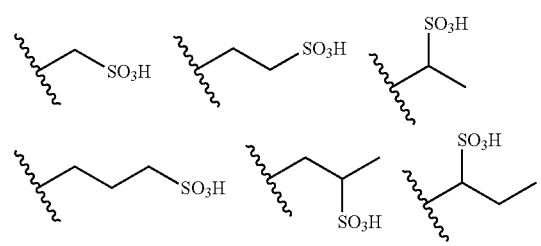

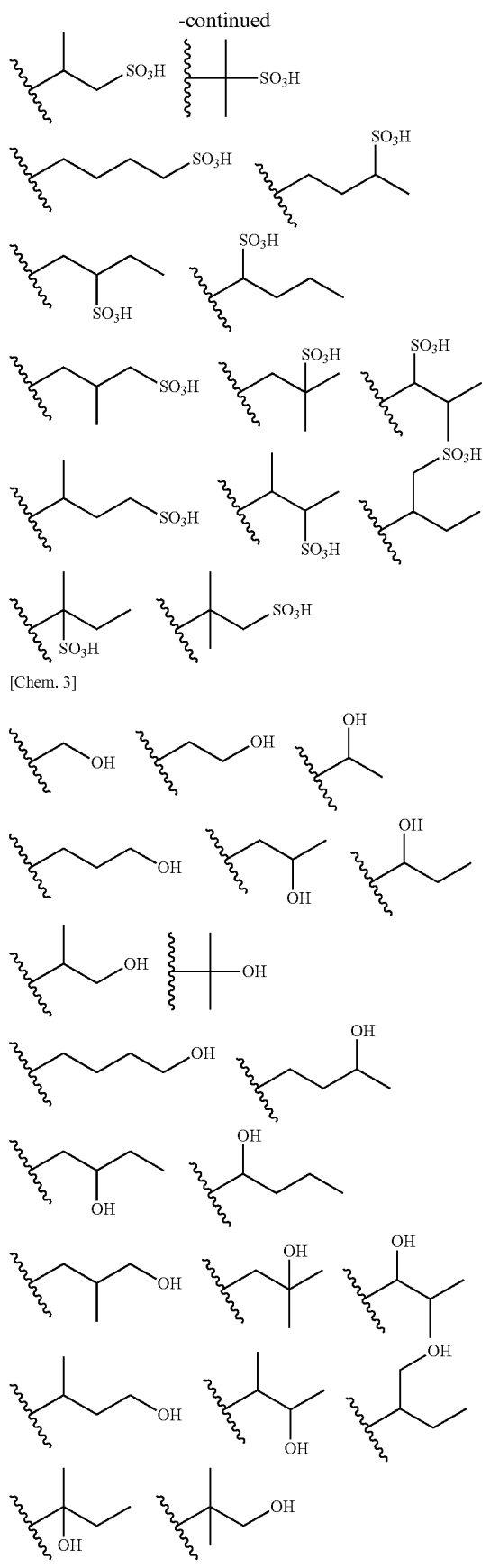
Among the specific examples of the hydrophilic groups represented by the above-described formula (A1), the following groups having $R^1$ represented by the formula are more preferable.
[Chem. 4]
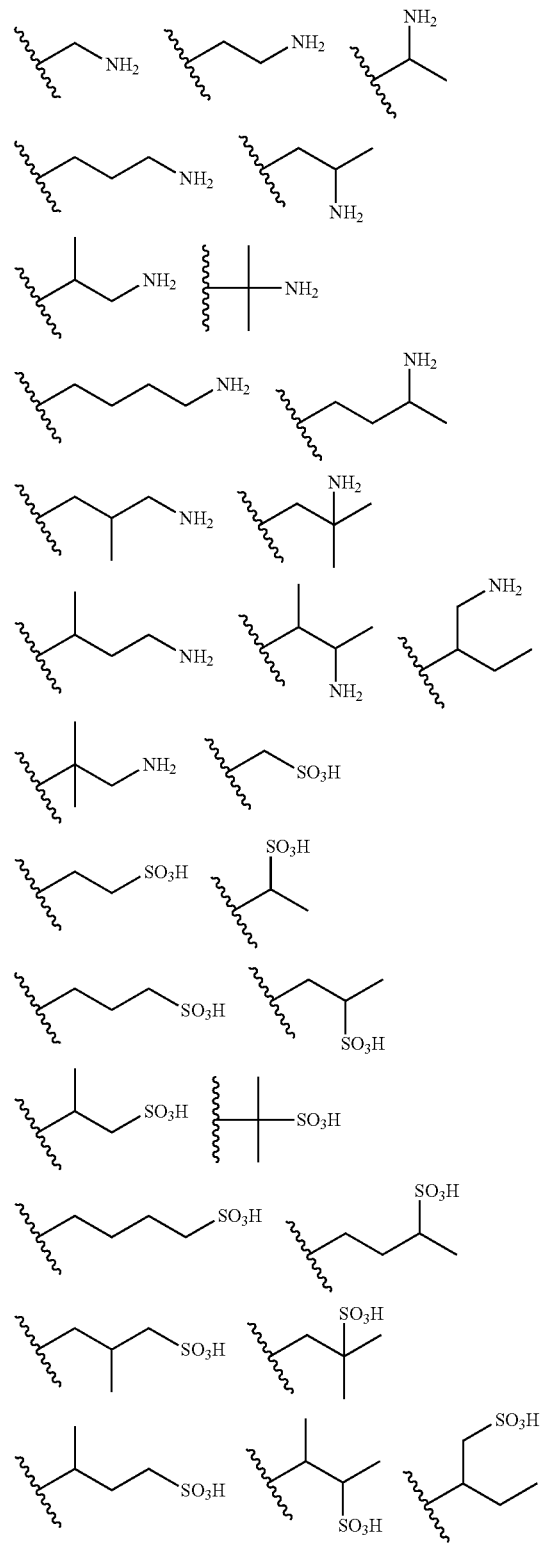

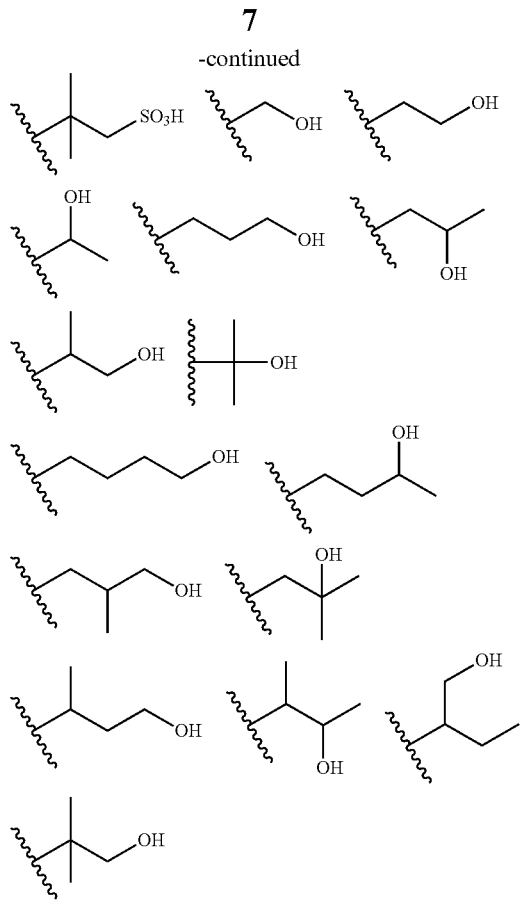

Among the specific examples of the hydrophilic groups represented by the above-described formula (A1), the groups having $R^1$ represented by the following formula are particularly preferable.

[Chem. 5]

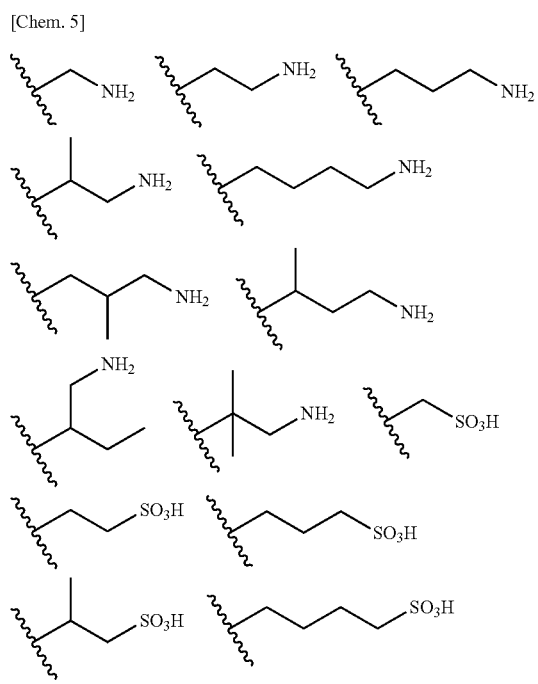

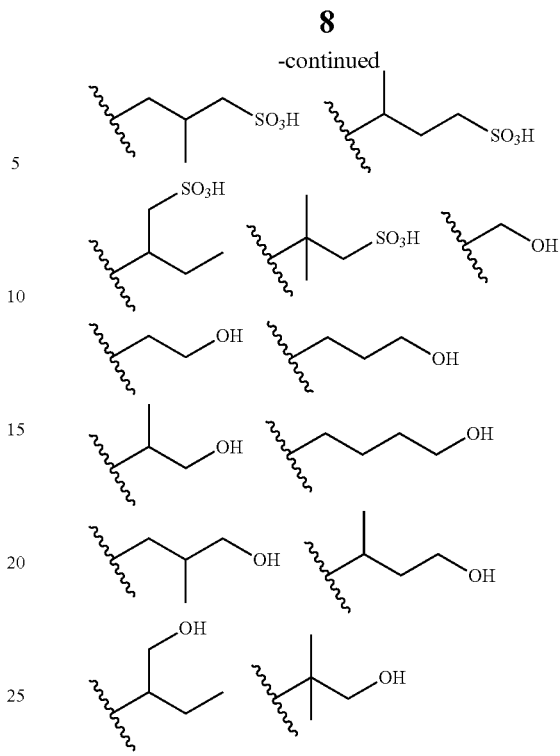

Specific examples of the hydrophobic group include a fluorinated hydrocarbon group, a silyl group, a siloxane group, an alkyl group having 6 to 20 carbon atoms, and an aromatic hydrocarbon group having 10 to 20 carbon atoms, and the like. As the fluorinated hydrocarbon group, the groups represented by the formula (A3) to be described later are preferable. Suitable examples of the silyl group include groups represented by the formula (A4) to be described later, wherein n is 0. Specific examples of the silyl group include a trimethyl silyl group, a triethyl silyl group, a tripropyl silyl group, a triisopropyl silyl group, a tert-butyl dimethyl silyl group, a triphenyl silyl group, and the like. Suitable examples of the siloxane group include groups represented by the formula (A4) to be described below, wherein n is 1 or more.

(A) The resin is preferably a polymer of monomers having an unsaturated bond from the viewpoint that various functional groups are easily introduced and the amount of functional groups is easily adjusted. Such a polymer may be a homopolymer or a copolymer.

In this case, the functional group I of (A) the resin is preferably a group derived from a monomer represented by the following formula (A2):

$$CH_2=CR^2-(R^3)_a-CO-R^4 \quad (A2)$$

(in the formula (A2), $R^2$ is a hydrogen atom or a methyl group, $R^3$ is a divalent hydrocarbon group, a is 0 or 1, $R^4$ is —OH, —O—$R^5$, or —NH—$R^5$, $R^5$ is a hydrocarbon group substituted with one or more functional groups selected from the group consisting of a hydroxyl group, a cyano group, and a carboxyl group).

In the above-described formula (A2), $R^3$ is a divalent hydrocarbon group. The number of carbon atoms of the divalent hydrocarbon group is not particularly limited, within a range in which the object of the present invention is not impaired. From the viewpoint that (A) the resin is easily obtained or prepared, the number of carbon atoms of the divalent hydrocarbon group as $R^3$ is preferably 1 to 20, more preferably 1 to 12, particularly preferably 1 to 10, and the most preferably 1 to 6.

The divalent hydrocarbon group as $R^3$ may be an aliphatic group, an aromatic group, and a hydrocarbon group including an aliphatic moiety and an aromatic moiety. When the divalent hydrocarbon group is an aliphatic group, the aliphatic group may be a saturated aliphatic group or an unsaturated aliphatic group. Furthermore, a structure of the aliphatic group may be a linear, branched, or cyclic group, or combination of these groups.

Specific examples of $R^3$ include a methylene group, an ethane-1,2-diyl group, an ethane-1,1-diyl group, a propane-1,3-diyl group, a propane-1,1-diyl group, a propane-2,2-diyl group, an n-butane-1,4-diyl group, an n-pentane-1,5-diyl group, an n-hexane-1,6-diyl group, an n-heptane-1,7-diyl group, an n-octane-1,8-diyl group, an n-nonane-1,9-diyl group, an n-decane-1,10-diyl group, an o-phenylene group, an m-phenylene group, a p-phenylene group, a naphthalene-2,6-diyl group, a naphthalene-2,7-diyl group, a naphthalene-1,4-diyl group, a biphenyl-4,4'-diyl group, and the like.

$R^4$ is —OH, —O—$R^5$, or —NH—$R^5$, and $R^5$ is a hydrocarbon group substituted with at least one functional group selected from the group consisting of a hydroxyl group, a cyano group, and a carboxyl group. The hydrocarbon group constituting a main skeleton of the group of $R^5$ may be a linear, branched, or cyclic aliphatic group, or an aromatic hydrocarbon group. The number of carbon atoms of the linear, branched, or cyclic aliphatic group is preferably 1 to 20, and more preferably 1 to 120 Suitable examples of the linear or branched aliphatic group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a sec-pentyl group, a tert-pentyl group, an n-hexyl group, an n-heptyl group, an n-octyl group, an n-nonyl group, an n-decyl group, and the like. Suitable examples of the cyclic aliphatic group include cycloalkyl groups such as a cyclopropyl group, a cyclobutyl group, a cyclopentyl group, a cyclohexyl group, a cycloheptyl group, and a cyclooctyl group; a group in which one hydrogen atom is removed from polycycloalkane such as adamantane, norbornane, isobornane, tricyclodecane, and tetracyclododecane, or a group in which one hydrogen atom is removed from C1-C4 alkyl substitute of these polycycloalkanes. Suitable examples of the aromatic hydrocarbon group include a phenyl group, a naphthyl group, an anthranil group, a phenanthrenyl group, and a biphenylyl group, and the like. The aromatic hydrocarbon group may be substituted with a C1-C4 alkyl group such as a methyl group and an ethyl group.

Particularly preferable specific examples of the unit derived from a monomer represented by formula (A2) include the following units a2-1 to a2-9. Among the following units a2-1 to a2-9, units a2-1 to a2-4 are more preferable.

[Chem. 6]

a2-1
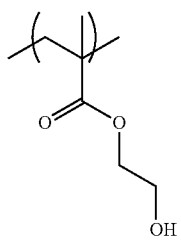

a2-2
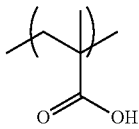

a2-3
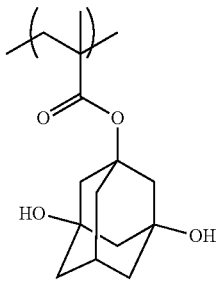

a2-4
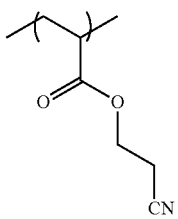

a2-5
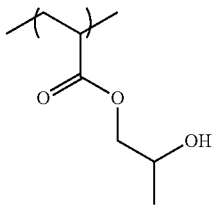

a2-6
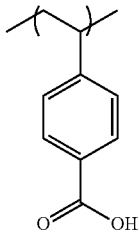

a2-7
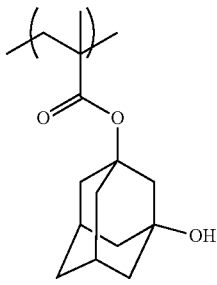

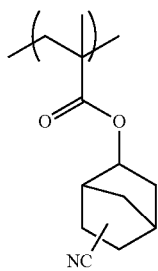

a2-8

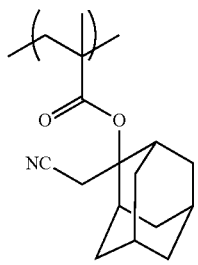

a2-9

When (A) the resin has a hydrophobic group as the functional group II, the functional group II is preferably derived from the monomer represented by the following formula (A3):

$$CH_2=CR^2-(CO-O)_b-R^6 \quad (A3)$$

(in the formula (A3), $R^2$ is a hydrogen atom, or a methyl group, h is 0 or 1, and $R^6$ is a fluorinated hydrocarbon group or a group represented by the following formula (A4):

$$-SiR^7R^8-(-O-SiR^7R^8-)_n-R^9 \quad (A4)$$

wherein $R^7$, $R^8$, and $R^9$ are, each independently, a hydrocarbon group having 1 to 6 carbon atoms, and n is an integer of 0 or more).

In the formula (A3), when $R^6$ is a fluorinated hydrocarbon group, the hydrocarbon group constituting a main skeleton of the fluorinated hydrocarbon group is similar to the hydrocarbon group constituting the main skeleton of the above-described group of $R^5$. The fluorinated hydrocarbon group may be a group in which all the hydrogen atoms of the hydrocarbon group are substituted with a fluorine atom. Specific examples of the fluorinated hydrocarbon group as $R^6$ include chain fluorinated alkyl groups such as —$CF_3$, —$CF_2CF_3$, —$(CF_2)_2CF_3$, —$(CF_2)_3CF_3$, —$(CF_2)_4CF_3$, —$(CF_2)_5CF_3$, —$(CF_2)_6CF_3$, —$(CF_2)_7CF_3$, —$(CF_2)_8CF_3$, —$(CF_2)_9CF_3$, —$CH_2CF_3$, —$CH_2CF_2CF_3$, —$CH_2(CF_2)_2CF_3$, —$CH_2(CF_2)_3CF_3$, —$CH_2(CF_2)_4CF_3$, —$CH_2(CF_2)_5CF_3$, —$CH_2(CF_2)_6CF_3$, —$CH_2(CF_2)_7CF_3$, —$CH_2(CF_2)_8CF_3$, —$CH_2CH_2CF_3$, —$CH_2CH_2CF_2CF_3$, —$CH_2CH_2(CF_2)_2CF_3$, —$CH_2CH_2(CF_2)_3CF_3$, —$CH_2CH_2(CF_2)_4CF_3$, —$CH_2CH_2(CF_2)_5CF_3$, —$CH_2CH_2(CF_2)_6CF_3$, —$CH_2CH_2(CF_2)_7CF_3$, and —$CH(CF_3)_2$; fluorinated aromatic hydrocarbon groups such as a pentafluorophenyl group, an o-trifluoromethyl phenyl group, an m-trifluoromethyl phenyl group, and a p-trifluoro ethyl phenyl group; fluorinated alicyclic groups such as an octafluoroadamanthyl group, and the like.

In the formula (A3), when $R^6$ is a group represented by the formula (A4), it is preferable that $R^7$, $R^8$, and $R^9$ are, each independently, a methyl group, an ethyl group, or a phenyl group, and more preferable that all of $R^7$, $R^8$, and $R^9$ are a methyl group. In the formula (A4), the upper limit of n is not particularly limited within a range in which the object of the present invention is not impaired. "n" is preferably an integer of 0 or more and 35 or less, and more preferably an integer 0 or more and 10 or less.

Particularly preferable specific examples of the unit having a hydrophobic group derived from a monomer represented by the formula (A3) include the units of the following a3-1 to a3-22. In the following units, units a3-8, a3-18, a3-19, and a3-22 are more preferable

[Chem. 7]

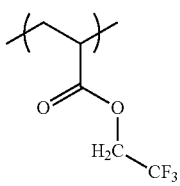

a3-1

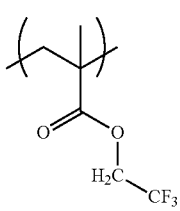

a3-2

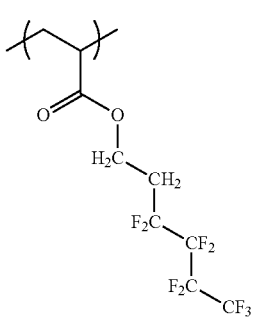

a3-3

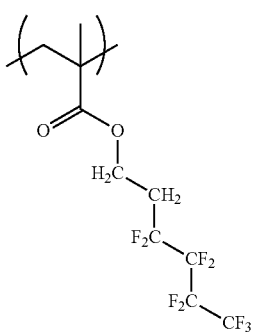

a3-4 a3-5
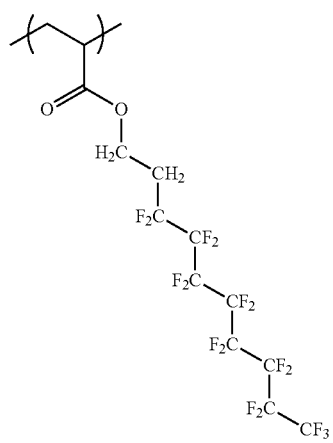
a3-6
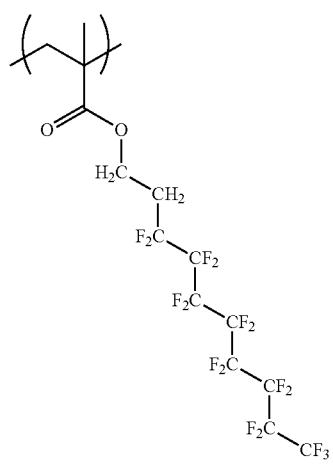
a3-7
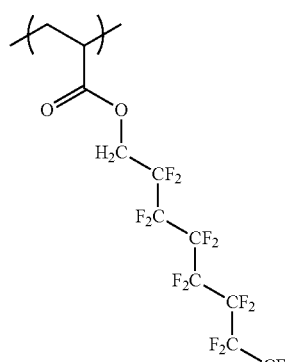
a3-8
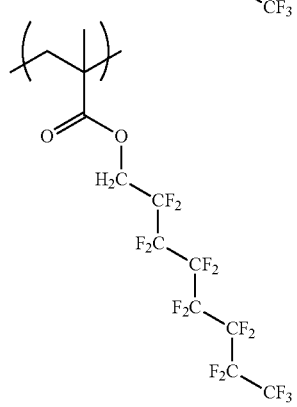
a3-9
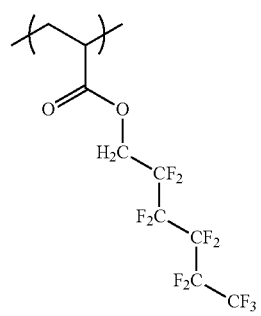
a3-10
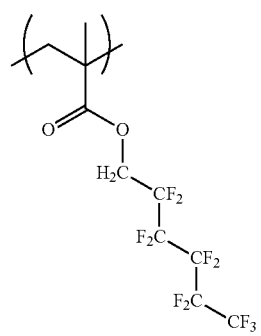
a3-11
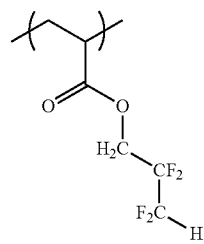
a3-12
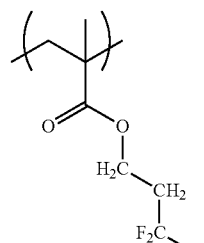
a3-13
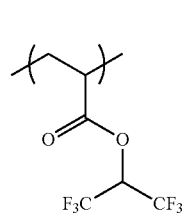
a3-14
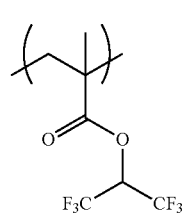

a3-15
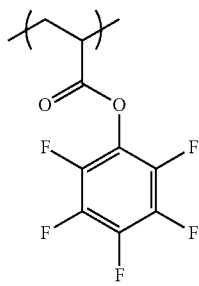

a3-16
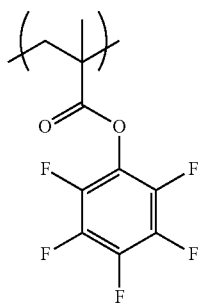

a3-17
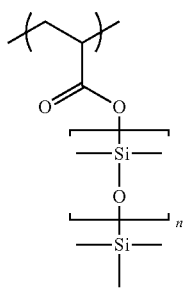

a3-18
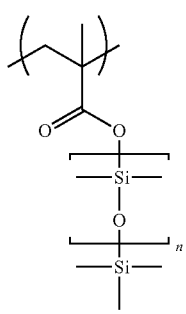

a3-19
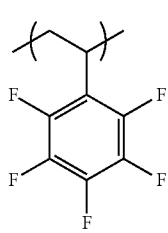

a3-20
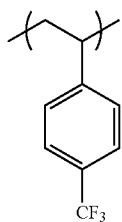

a3-21
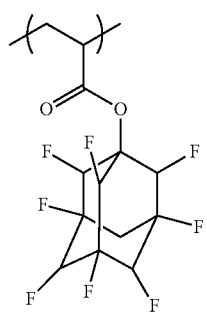

a3-22
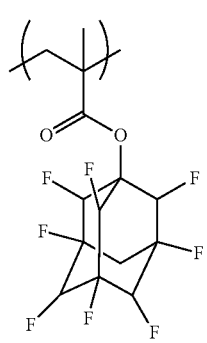

Furthermore, when (A) the resin has a hydrophilic group as the functional group II, the functional group II is preferably derived from a monomer represented by the following formula (A5):

$$CH_2=CR^2-CO-NH-R^1 \quad (A5)$$

(in the formula (A5), $R^1$ is an alkyl group having 1 to 4 carbon atoms substituted with one or more groups selected from the group consisting of an amino group, a sulfonic acid group, and a hydroxyl group, or a hydrogen atom; and $R^2$ is a hydrogen atom or a methyl group).

In the formula (A5), $R^1$ is the same as described above.

Particularly preferable specific examples of the unit having a hydrophilic group derived from a monomer represented by the formula (A5) include the following units a5-1 to a5-5. Among the units, units a5-1 to a5-4 are more preferable.

[Chem. 8]

a5-1
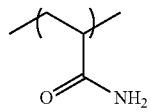

a5-2
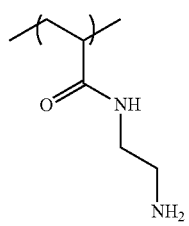

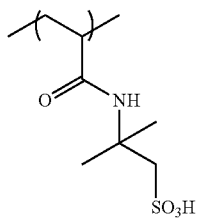

a5-3

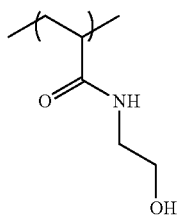

a5-4

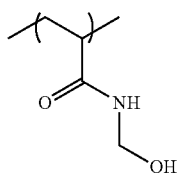

a5-5

When (A) the resin is a polymer of monomers, having an unsaturated bond, such a polymer may include constituent units other than the unit derived from the monomer represented by the formula (A2), the unit derived from the monomer represented by the formula (A3), and the unit derived from the monomer represented by the formula (A5) described above within a range in which the object of the present invention is not impaired.

Examples of the other constituent units include constituent units derived from monomers such as methyl(meth)acrylate, ethyl(meth)acrylate, isopropyl(meth)acrylate, n-propyl(meth)acrylate, n-butyl(meth)acrylate, isobutyl (meth)acrylate, tert-butyl(meth)acrylate, n-pentyl (meth) acrylate, isopentyl(meth)acrylate, phenyl(meth)acrylate, N-methyl(meth)acrylamide, N-ethyl(meth) acrylamide, N-n-propyl(meth)acrylamide, N-isopropyl (meth) acrylamide, N-n-butyl(meth)acrylamide, N-n-pentyl(meth)acrylamide, N-isopentyl(meth)acrylamide, N-phenyl(meth)aorylamide, N,N-dimethyl(meth)acrylamide, N,N-diethyl(meth)acrylamide, N,N-di-n-propyl(meth)acrylamide, N,N-di-n-butyl(meth)acrylamide, N,N-di-n-pentyl(meth)acrylamide, styrene, α-methyl styrene, β-methyl styrene, o-methyl styrene, m-methyl styrene, p-methyl styrene, and chlorostyrene.

When (A) the resin is a polymer of monomers, having an unsaturated bond, the mole ratio of constituent units derived from the monomer represented by the formula (A2) in the total constituent units included in such a polymer is preferably 0.1 to 50% by mole, more preferably 1 to 20% by mole, and particularly preferably 1 to 15% by mole.

When (A) the resin is a polymer of monomers, having an unsaturated bond, the mole ratio of constituent units derived from the monomers represented by the formula (A3) or (A5) in the total constituent units is preferably 50 to 99.9% by mole, more preferably 60 to 99% by mole, and particularly preferably 70 to 99% by mole. However, when the constituent units derived from the monomer represented by formula (A5) include any one group of a hydroxyl group, a cyano group, and a carboxyl group, the ratio of constituent units derived from the monomer represented by formula (A5) in the total constituent units included in the polymer may be 100%.

The amount of (A) the resin included in the treatment liquid is not particularly limited within a range in which the object of the present invention is not impaired, and the amount can be appropriately determined considering the application property of the treatment liquid. Typically, the amount of (A) the resin in the treatment liquid preferably has the following relationship between the amount of (A) the resin and the amount of (C) a solvent to be described later. When the mass of the resin in the treatment liquid is 100 parts by mass, the amount of (C) the solvent to be described later is preferably 100 to 10000 parts by mass, more preferably 500 to 8000 parts by mass, and particularly preferably 1000 to 6000 parts by mass.

<(B) Strong Acid>

A surface treatment liquid may include (B) a strong acid. (B) The strong acid has a pKa of 1 or less. Note here that the pKa is a value in water. (B) The strong acid acts on the functional group I of (A) the resin to promote attachment or bonding of (A) the resin to a surface of a treatment target. Types of (B) the strong acid are not particularly limited as long as they have a pKa of 1 or less. As (B) the strong acid, it is possible to use two or more acids having a pKa of 1 or less in combination.

Preferable examples of (B) the strong acid include fluorinated aliphatic carboxylic acid (for example, trifluoroacetic acid, and the like), fluorosulfonic acid, alkane sulfonic acid having 1 to 30 carbon atoms (for example, methane sulfonic acid, dodecane sulfonic acid, and, the like), aryl sulfonic acid (for example, benzene sulfonic acid, p-toluene sulfonic acid, and the like), fluoroalkane sulfonic acid having 1 to 30 carbon atoms (for example, trifluoromethane sulfonic acid, pentafluoroethane sulfonic acid, heptafluoropropane sulfonic acid, nonafluorobutane sulfonic acid, undecafluoropentane sulfonic acid, and tridecafluorohexane sulfonic acid), a bis(sulfonyl)imide compound, a cyclic sulfonylimide compound in which two sulphonyl groups are linked to each other by a fluoroalkylene group, N-acyl fluoroalkane sulfonic acid amide, and the like.

When these (B) strong acids include a fluoroalkyl group or a fluoroalkylene group, such a group may be a partially fluorinated fluoroalkyl group or fluoroalkylene group, a completely fluorinated perfluoroalkyl group or perfluoroalkylene group.

Among these (B) strong acids, fluorosulfonic acid, alkane sulfonic acid having 1 to 30 carbon atoms, fluoroalkane sulfonic acid having 1 to 30 carbon atoms, bis(fluoroalkylsulphonyi)imidic acid, cyclic sulfone imidic acid in which two sulphonyl groups are linked to each other by a fluoroalkvlene group, and N-acyl fluoroalkane sulfonic acid amide are preferable, and fluoroalkane sulfonlc acid having 1 to 30 carbon atoms, a bis(sulfonyl)imide compound, a cyclic sulfonylimide compound in which two sulphonyl groups are linked to each other by a fluoroalkylene group, and N-acyl fluoroalkane sulfonic acid amide are preferable.

As fluoroalkane sulfonic acid having 1 to 30 carbon atoms, trifluoromethane sulfonic acid, pentafluoroethane sulfonic acid, heptafluoropropane sulfonic acid, nonafluorobutane sulfonic acid, and the like, are preferable.

As the bis(sulfonyl)imide compound, a compound represented by the following formula (B1) is preferable.

[Chem. 9]

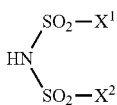
(B1)

In the formula (B1), $X^1$ and $X^2$, each independently, represent a hydrocarbon group substituted with at least one electron-withdrawing group. The hydrocarbon group may be substituted with various groups other than the electron-withdrawing group within a range in which the strong acidity of the compound represented by the formula (B1) is not impaired. The number of carbon atoms of $X^1$ and $X^2$ is preferably 1 to 20, more preferably 1 to 10, and particularly preferably 1 to 7. As the hydrocarbon group substituted with an electron-withdrawing group, a fluorinated alkyl group and an aryl group having a nitro group are preferable. The fluorinated alkyl group may be linear, branched or cyclic. As the fluorinated alkyl group, a completely fluorinated perfluoroalkyl group is preferable. As the aryl group having a nitro group, an o-nitrophenyl group, an m-nitrophenyl group, and a p-nitrophenyl group are preferable, and a p-nitrophenyl group are more preferable.

Specific examples of the compound represented by formula (B1) include compounds of the following formula.

[Chem. 10]

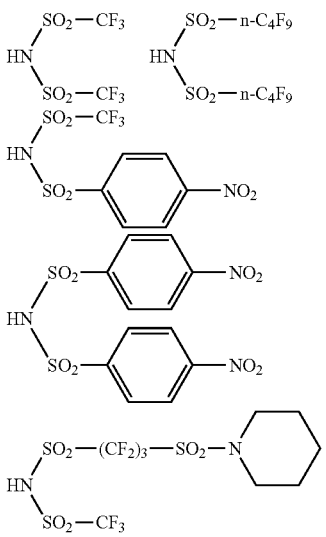

As the cyclic sulfonyl imide compound in which two sulphonyl groups are linked to each other by a fluoroalkylene group, a compound represented by the following formula (B2) is preferable.

[Chem. 11]

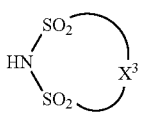
(B2)

In the formula (B2), $X^3$ represents a linear or branched alkylene group in which at least one hydrogen atom is substituted with a fluorine atom. The number of carbon atoms of $X^3$ is preferably 2 to 6, more preferably 3 to 5, and particularly preferably 3.

Preferable specific examples of the compound represented by formula (B2) include compounds of the following formula.

[Chem. 12]

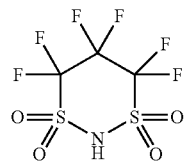

As N-acyl fluoroalkane sulfonic acid amide, a compound represented by the following formula (B3) is preferable.

[Chem. 13]

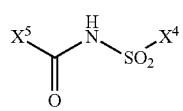
(B3)

In the formula (B3), $X^4$ represents a linear or branched alkyl group in which at least one hydrogen atom is substituted with a fluorine atom. The number of carbon atoms in $X^4$ is preferably 1 to 10, more preferably 1 to 7, and particularly preferably 1 to 3, $X^5$ is a hydrocarbon group. The hydrocarbon group is similar to the hydrocarbon group constituting a main skeleton of the group of $R^5$.

Preferable specific examples of the compound represented by formula (B3) include the compounds of the following formula.

[Chem. 14]

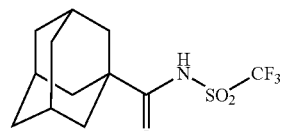

The content of (B) the strong acid in the treatment liquid when treatment liquid includes (B) the strong acid is not particularly limited as long as the surface treatment can be successfully carried out. The content of (B) the strong acid in the surface treatment liquid is preferably 0.1 to 20 Parts by mass, more preferably 0.1 to 10 parts by mass, and particularly preferably 0.1 to 5 parts by mass with respect to 100 parts by mass of (A) the resin.

<Solvent (C)>

(C) A solvent is not particularly limited as long as it can dissolve (A) a resin and (B) a strong acid. As long as predetermined amounts of (A) the resin and (B) the strong acid are dissolved in the treatment liquid, the treatment liquid may include (A) the resin and (B) the strong acid which have not been dissolved. It is preferable that (A) the resin and (B) the strong acid are completely dissolved in the treatment liquid. When the treatment liquid includes insoluble matter, the insoluble matter may be attached to a surface of a treatment target at the time of surface treatment. In this case, the surface-treated surface of the treatment target is rinsed with a method to be described later, and thereby it is possible to remove the insoluble matter attached to the surface of the treatment target.

(C) The solvent may be water, an organic solvent, or an aqueous solution of an organic solvent.

Specific examples of the organic solvent used as (C) the solvent include:

sulfoxides such as dimethylsulfoxide;

sulfones such as dimethylsulfone, diethylsulfone, bis(2-hydroxyethyl)sulfone, and tetramethylene sulfone;

amides such as N,N-dimethylformamide, N-methylformamide, N,N-dimethylacetamide, N-methylacetamide, and N,N-dimethylacetamide;

lactams such as N-methyl 2-pyrrolidone, N-ethyl-2-pyrrolidone, N-propyl-2-pyrrolidone, N-hydroxymethyl-2-pyrrolidone, and N-hydroxyethyl-2-pyrrolidone;

imidazolidinones such as 1,3-dimethyl-2-imidazolidinone, 1,3-diethyl-2-imidazolidinone, and 1,3-diisopropyl-imidazolidinone;

dialkyl glycol ethers such as dimethyl glycol, dimethyl diglycol, dimethyl trigylcol, methylethyl diglycol, diethyl glycol, and triethylene glycol butyl methyl ether;

(poly)alkylene glycol monoalkyl ethers such as ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, methylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether;

(poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate;

other ethers such as dimethyl ether, diethyl ether, methylethyl ether, dipropyl ether, diisopropyl ether, dibutyl ether, diisoamyl ether, diethylene glycol dimethyl ether, diethylene glycol methylethyl ether, diethylene glycol diethyl ether, and tetrahydrofuran;

ketones such as methyl ethyl ketone, cyclohexanone, 2-heptanone, and 3-heptanone;

alkyl lactate esters such as methyl 2-hydroxypropionate and ethyl 2-hydroxypropionate; other esters such as 2-hydroxy-2-methylpropionic acid ethyl, 3-methoxypropionic acid methyl, 3-methoxypropionic acid ethyl, 3-ethoxypropionic acid methyl, 3-ethoxypropionic acid ethyl, ethoxy acetic acid ethyl, hydroxyl acetic acid ethyl, 2-hydroxy-3-methylbutanoic acid methyl, 3-methyl-3-methoxybutyl acetate, 3-methyl-3-methoxybutyl propionate, ethyl acetate, n-propyl acetate, i-propyl acetate, n-butyl acetate, i-butyl acetate, n-pentyl formate, i-pentyl acetate, n-butyl propionate, ethyl butyrate, n-propyl butyrate, i-propyl butyrate, n-butyl butyrate, methyl pyruvate, ethyl pyruvate, n-propyl pyruvate, methyl acetoacetate, ethyl acetoacetate, and ethyl 2-oxobutanoate;

lactones such as β-propiolactone, γ-butyrolactone, and 5-pentyrolactone;

linear, branched, or cyclic aliphatic hydrocarbons such as n-hexane, n-heptane, n-octane, n-nonane, methyloctane, n-decane, n-undecane, n-dodecane, 2,2,4,6,6-pentamethyl heptane, 2,2,4,4,6,8,8-heptamethyl nonane, cyclohexane, and methyl cyclohexane;

aromatic hydrocarbons such as benzene, toluene, xylene, trimethyl benzene, and naphthalene;

terpenes such as p-menthane, diphenyl menthane, limonene, terpinene, bornane, norbornane and pinane; and the like.

When (C) the solvent is a mixed solvent of water and an organic solvent, the content of the organic solvent in (C) the solvent is preferably 10% by mass or more and more preferably 20% by mass or more.

<Other Components>

The treatment liquid may include various components in addition to (A) the resin and (C) the solvent mentioned above as long as the purpose of the present invention is not impaired. Examples of the other components include a coloring agent, a surface-active agent, a defoaming agent, a viscosity modifier, and the like, in addition to (B) the strong acid described above.

<Preparation Method of Treatment Liquid>

A method for preparing a surface treatment liquid is not particularly limited. The treatment liquid can be typically prepared by homogeneously mixing a predetermined amount of (A) the resin, and (C) the solvent, and other components if necessary.

The above-described treatment liquid is suitably used for, for example, surface treatment for preventing cell adhesion to a cell culture instrument and a micro channel device or the like for circulating a liquid including biological samples such as cells, and surface treatment for the purpose of providing various articles with an antifouling property, an antifog property, or the like. When the surface of the treatment target is treated with the above-described treatment liquid, adsorption of protein and adhesion of cells on the surface of the treatment target can be suppressed.

<<Surface Treatment Method>>

The surface treatment method using the above-described surface treatment liquid usually includes applying a surface treatment liquid to a surface of a treatment target. The applying method of the surface treatment liquid is not particularly limited. Specific examples of the applying method include a spin coating method, a spray method, a roller coating method, a dipping method, and the like. When the treatment target is a substrate, since uniform application of the surface treatment liquid allows a surface of the substrate to be uniformly hydrophilic or hydrophobic, a spin coating method is preferable as an applying method.

Material for the surface of the treatment target to which a surface treatment liquid is to be applied is not particularly limited, and the material may be an organic material or an inorganic material. Examples of the organic material include various resin materials including polyester resin such as PET resin and PET resin; various nylon; polyimide resin; polyamide-imide resin; polyolefin such as polyethylene and polypropylene; polystyrene; (meth)acrylic resin; and the like. Furthermore, photosensitive resin components included in various resist material, and alkali soluble resin components are also preferable as the organic material. Examples of the inorganic material include glass, silicon, and various metal such as copper, aluminum, iron and tungsten. The metal may be an alloy.

Material for surfaces to be surface-treated by the above-described surface treatment liquid is not particularly limited. However, when the material of a surface to which a surface treatment liquid is applied is an organic material, it is preferable to use a surface treatment liquid including (A) a resin having a hydroxyl group and/or a carboxyl group as the functional group I. When the material for a surface to which a surface treatment liquid is to be applied is an inorganic material, it is preferable to use a surface treatment liquid including (A) a resin having a hydroxyl group and/or a cyano group as the functional group I.

Shapes of a treatment target are not particularly limited. The treatment target may be a flat substrate, and may have a three-dimensional shape such as a spherical shape and a columnar shape. Furthermore, the surface of the treatment target may be flat, or may have regular or irregular concavity and convexity.

After the surface treatment liquid is applied to a surface of the treatment target, a coated film may be heated to remove at least part of (C) the solvent, as necessary.

It is preferable that a portion of the treatment target to which the surface treatment liquid has been applied is rinsed. As described above, when the surface treatment liquid including (A) the resin having a weight-average molecular weight of 100,000 or more and having a predetermined functional group is applied on the surface of the treatment target, (A) the resin is successfully attached or bonded to the surface of the treatment target. However, a certain amount of (A) the resin has not been attached or bonded to the surface of the treatment target. Therefore, in order to reduce the influence of (A) the resin on the surface property of the treatment target as much as possible, it is preferable that (A) the resin which has not been attached or bonded to the surface may be washed out by rinsing.

When the surface treatment liquid includes water as (C) the solvent, rinsing with water is preferable. Furthermore, when the surface treatment liquid includes an organic solvent as (C) the solvent, rinsing with an organic solvent is also preferable. When rinsing with an organic solvent, it is preferable to use an organic solvent of the same type as the organic solvent included in the surface treatment liquid.

After the surface treatment liquid is applied or rinsed, the surface of the treatment target is dried, thereby obtaining an article, which has been successfully made hydrophilic or hydrophobic. Furthermore, as described above, when the surface of the treatment target is treated with the above-described treatment liquid, adsorption of protein and adhesion of cells to the surface of the treatment target can be suppressed. Therefore, the above-described surface treatment method is preferably carried out for the purpose of suppressing adsorption of protein in the surface of the treatment target or the purpose for suppressing adhesion of cells to the surface of the treatment target

EXAMPLES

Hereinafter, the present invention will be explained more specifically by way of Examples. However, the present invention is not limited to the following Examples.

Examples 1 to 11 and Comparative Examples 1 to 4

In each Example and Comparative Example, resin containing the constituent units to be described below in the ratios listed in Table 1 was used as (A) a resin. Units A-1 to A-5 are constituent units for introducing a functional group II as a hydrophilic group or a hydrophobic group into (A) the resin. Units A-1 to A-3 have a hydrophilic group. Units A-4 and A-5 have a hydrophobic group. Units B-1 to B-3 are constituent units for introducing a functional group I into (A) the resin.

[Chem. 15]

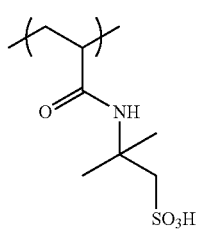

A-1

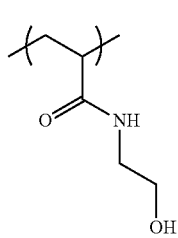

A-2

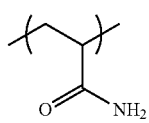

A-3

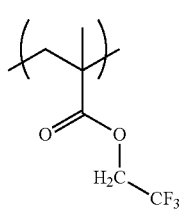

A-4

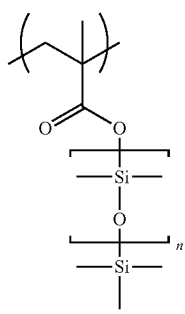

A-5

[Chem. 16]

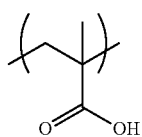

B-1

-continued

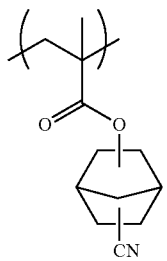
B-2

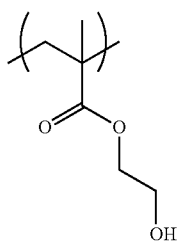
B-3

In Examples and Comparative Examples, as (C) a solvent,
S1: ethanol aqueous solution (concentration: 90% by mass) and
S2: propylene glycol monomethyl ether were used.

(Preparation of Surface Treatment Liquid)

(A) Resins including the constituent units of types and molar ratios described an Tables 1 and 2 were dissolved in solvents of types described in Tables 1 and 2 such that the concentration became 1% by mass to obtain surface treatment liquid of each Example and Comparative Example. Weight-average molecular weights of resins (A) used in Examples and Comparative Examples are shown in Tables 1 and 2.

In Examples 4 to 6, resin including only unit A-2 was used. The 2-hydroxyethyl amino group included in the unit A-2 is a hydrophilic group and is also a hydroxyl group-containing group. Therefore, the hydroxyl group included in the unit A-2 also serves as the functional group I.

(Evaluation of Surface Treatment Effect)

Surface treatment was carried out according to the following method, by using the surface treatment liquids of Examples 1 to 11 and Comparative Examples 1 to 4, which were obtained by the above-described method. In Examples 1 to 9 and Comparative Examples 1 to 3, as a treatment target, a film of cycloolefin polymer ("ZEONOR"® manufactured by Nippon Zeon Co., Ltd.) was used. In Examples 10 and 11 and Comparative Example 4, as the treatment target, a silicon wafer was used. As to types of treatment targets, in Tables 1 and 2, the film of cycloolefin polymer is described as "resin", and the silicon wafer is described as "Si".

In Examples 1 to 9 and Comparative Examples 1 to 3, surface treatment was carried out by the following method. Firstly, a film of the treatment target was dip-coated with a treatment liquid, and then, the film was dried in an oven for five minutes. After drying, a surface of the film of the treatment target was washed with pure water, and then air-dried to obtain a surface-treated film.

In Examples 10 and 11 and Comparative Example 4, surface treatment was carried out by the following method. Firstly, a silicon wafer was spin-coated with a surface treatment liquid at 1000 rpm for 60 seconds, and then, dried on a hot plate at 100° C. for 60 seconds. After drying, the surface of the silicon wafer was washed with propylene glycol monomethyl ether acetate, and then air-dried to obtain a surface-treated silicon wafer. A water contact angle was measured using Dropmaster 700 (manufactured by Kyowa Interface Science Co., Ltd.) as follows: a pure water droplet (2.0 µL) was dropped onto a surface-treated surface of a substrate, and the contact angle was measured after 10 seconds of dropping. Measurement results of the water contact angle are listed in Tables 1 and 2. Note here that water contact angles of the treatment targets before surface treatment are also listed in Tables 1 and 2.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| (A) Resin Constituent unit (% by mole) | A-1 | 95 | 95 | 95 | — | — | — | 10 | 10 | 10 | — | — |
| | A-2 | — | — | — | 100 | 100 | 100 | — | — | — | — | — |
| | A-3 | — | — | — | — | — | — | 85 | 85 | 85 | — | — |
| | A-4 | — | — | — | — | — | — | — | — | — | 95 | — |
| | A-5 | — | — | — | — | — | — | — | — | — | — | 95 |
| | B-1 | 5 | — | — | — | — | — | 5 | 5 | 5 | 5 | 5 |
| | B-2 | — | 5 | — | — | — | — | — | — | — | — | — |
| | B-3 | — | — | 5 | — | — | — | — | — | — | — | — |
| (A) Resin Weight-average molecular weight (×10⁶) | | 1.1 | 0.6 | 0.3 | 1.1 | 0.6 | 0.3 | 1.1 | 0.6 | 0.3 | 0.3 | 0.3 |
| (C) Solvent | Type | S1 | S1 | S1 | S1 | S1 | S1 | S1 | S1 | S1 | S2 | S2 |
| Type of treatment target | | Resin | Resin | Resin | Resin | Resin | Resin | Resin | Resin | Resin | Si | Si |
| Water contact angle (°) | Before treatment | 90 | 90 | 90 | 90 | 90 | 90 | 90 | 90 | 90 | 15 | 15 |
| | After treatment | 14 | 14 | 14 | 14 | 15 | 14 | 16 | 15 | 16 | 113 | 111 |

TABLE 2

| | | Comparative Example | | | |
|---|---|---|---|---|---|
| | | 1 | 2 | 3 | 4 |
| (A) Resin Constituent unit (% by mole) | A-1 | 95 | 95 | 100 | — |
| | A-2 | — | — | — | — |
| | A-3 | — | — | — | — |
| | A-4 | — | — | — | — |
| | A-5 | — | — | — | 95 |
| | B-1 | 5 | 5 | — | 5 |
| | B-2 | — | — | — | — |
| | B-3 | — | — | — | — |
| (A) Resin Weight-average molecular weight (×10⁶) | | 0.05 | 0.05 | 0.05 | 0.05 |

TABLE 2-continued

| | | Comparative Example | | | |
|---|---|---|---|---|---|
| | | 1 | 2 | 3 | 4 |
| (C) Solvent | Type | S1 | S1 | S1 | S2 |
| | Type of treatment target | Resin | Resin | Resin | Si |
| Water contact angle (°) | Before treatment | 90 | 90 | 90 | 15 |
| | After treatment | 90 | 91 | 90 | 16 |

According to Examples 1 to 11, it is shown that when a surface treatment liquid including (A) a resin having a weight-average molecular weight of 100,000 or more and having a predetermined functional group and (C) a solvent, a surface of a treatment target including a cycloolefin polymer, silicon, or the like, is successfully made to be hydrophilic or hydrophobic.

According to Comparative Examples 1 to 4, it is shown that when (A) a resin having a weight-average molecular weight of less than 100,000 is used, regardless of types of functional groups of the resin, a sufficient surface treatment effect cannot be achieved.

Examples 12 and 13

In Example 12, (A) a resin having a ratio of constituent units A-1/A-3/B-3 of 85/10/5 (% by mole) and a weight-average molecular weight of 800,000 was dissolved in an ethanol aqueous solution (concentration: 90% by mass) as (C) a solvent such that the concentration became 1.0% by mass to obtain a surface treatment liquid. In Example 13, (A) a resin having a ratio of constituent units A-3/B-1 of 95/5 (% by mole) and a weight-average molecular weight of 1,000,000 was dissolved in water as (C) a solvent such that the concentration became 1.0% by mass to obtain a surface treatment liquid. The treatment target that had been surface-treated with the surface treatment liquid of Example 12 and untreated treatment target were subjected to verification test of cell adhesion according to the following method. Furthermore, the treatment target that had been surface-treated with the surface treatment liquid of Example 12, the treatment target that had been surface-treated with the surface treatment liquid of Example 13, and untreated treatment target were subjected to verification test of cell adhesion according to the following method.
(Verification Test of Cell Adhesion)

Into wells of Cell Culture 24-well microplates (Falcon®, 353,047), 500 µL of surface treatment liquid of Example 12 was added. Then, the surface treatment liquid was removed using an aspirator to such a degree that liquid spread thinly through the surface of the wells. Thereafter, the resultant was dried in an oven at 65° C. for 30 minutes, and washed with 1 mL of PBS three times to produce a surface-treated plate. As a comparison subject, non-treated plate was prepared, A549 adenocarcinomic human alveolar basal epithelial cells were prepared in 10% FBS-added MEMa medium at 300,000 cells per well, and seeded in a surface-treated plate and non-treated plate. The cells were cultured in an incubator at 37° C. and 5% $CO_2$ for 40 hours. Cellstain Hoechst 33342 was added to the wells, for nuclear staining for 5 minutes. The wells were washed with 1 mL of PBS once, and then 1 mL of 10% FBS-added MEMa medium was added thereto, fluorescence of cells was observed using a fluorescence microscope (KEYENCE CORPORATION, BZ-9000) and the number of cells in the field of view was counted. In non-treated plate, the number of cells per field of view was 2,560 cells. On the other hand, in the surface-treated plate, the number of cells per field of view was 0. Thus, the suppression effect of cell adhesion by treatment using the surface treatment liquid of Example 12 was verified.
(Verification Test of Protein Adsorption)

Into the wells of a 96-well immuno plate (Nunc® MaxiSorp, 442404), 200 µL of surface treatment liquid of Example 12 or 13 was added. Then, surface treatment liquid was removed using an aspirator to such a degree that liquid spread thinly through the surface of the wells. Thereafter, the resultant was dried in an oven at 65° C. for 30 minutes, and washed with 1 mL of PBS three times to produce a surface-treated plate. As a comparison subject, non-treated plate was prepared. HRP-labelled Goat Anti-Mouse IgG Fc Fragment (Bethyl Laboratories Inc., A90-131P) was diluted with PBS so as to be 0.2 µg/ml, and 100 µl of the resultant was added to wells. The resultant was allowed to stand still at room temperature for one hour, and washed with PBS five times. Color reaction was carried out by adding 100 µL TMB One Component HRP Microwell Substrate (Bethyl Laboratories Inc., E102). An enzyme reaction was stopped by adding 100 µL of ELISA Stop Solution (Bethyl Laboratories Inc., E115), and absorbance (wavelength: 450 nm) was measured by Microplate Reader (BioTek Instruments Inc., Synergy 4). In the non-treated plate, the absorbance was 1.414 (average of 3 wells, standard deviation: 0.027). On the other hand, in the plate surface-treated with the treatment liquid of Example 12, the absorbance was 0.669 (average of 3 wells, standard deviation: 0.049). In the plate surface-treated with the treatment liquid of Example 13, the absorbance was 0.223 (average of 3 wells, standard deviation: 0.118). The above test verified that surface treatment using the surface treatment liquid of Example 12 or 13 can suppress adsorption of protein onto a plate surface.

The invention claimed is:
1. A surface treatment liquid, comprising:
(A) a resin, and
(C) a solvent,
wherein
 (A) the resin comprises a functional group I which is one or more groups selected from the group consisting of a hydroxyl group, a cyano group, and a carboxyl group, and a functional group II being a hydrophilic group or a hydrophobic group other than the functional group I, the hydrophobic group being at least one group selected from the group consisting of a silyl group, a siloxane group, an alkyl group having 6 to 20 carbon atoms and having no fluorine atom, and an aromatic hydrocarbon group having 10 to 20 carbon atoms; or
 (A) the resin comprises a functional group II being a hydrophilic group or a hydrophobic group comprising one or more groups selected from a hydroxyl group, a cyano group, and a carboxyl group;
wherein (A) the resin has a weight-average molecular weight of 100,000 or more,
wherein the hydrophilic group of the functional group II comprises no polyoxyalkylene group.
2. The surface treatment liquid according to claim 1, wherein the hydrophobic group is one or more groups selected from the group consisting of a fluorinated hydrocarbon group, a silyl group, and a siloxane group.

3. The surface treatment liquid according to claim 1, wherein the functional group II is a hydrophobic group, and is derived from a monomer represented by the following formula (A3):

$$CH_2=CR^2-(CO-O)_b-R^6 \quad (A3)$$

wherein in the formula (A3), $R^2$ is a hydrogen atom or a methyl group, b is 0 or 1, and $R^6$ is a fluorinated hydrocarbon group or a group represented by the following formula (A4):

$$-SiR^7R^8-(-O-SiR^7R^8-)_n-R^9 \quad (A4)$$

wherein $R^7$, $R^8$, and $R^9$ are, each independently, a hydrocarbon group having 1 to 6 carbon atoms, and n is an integer of 0 or more.

4. A surface treatment method, comprising:
applying a surface treatment liquid to a surface of a treatment target, the surface treatment liquid comprising (A) a resin, and (C) a solvent,
wherein
(A) the resin comprises a functional group I which is one or more groups selected from the group consisting of a hydroxyl group, a cyano group, and a carboxyl group, and a functional group II being a hydrophilic group other than the functional group I;
wherein the hydrophilic group of the functional group II is a group represented by the following formula (A1):

$$-NH-R^1 \quad (A1)$$

wherein in the formula (A1), $R^1$ represents an alkyl group having 1 to 4 carbon atoms substituted with one or more groups selected from the group consisting of an amino group, a sulfonic acid group and a hydroxyl group, or a hydrogen atom,
wherein the hydrophilic group of the functional group II comprises no polyoxyalkylene group,
wherein (A) the resin has a weight-average molecular weight of 100,000 or more,
wherein material on the surface to which the surface treatment liquid is to be applied is an inorganic material, and
wherein, when the functional group I is present, (A) the resin has at least one of a hydroxyl group and a cyano group.

5. A surface treatment liquid, comprising:
(A) a resin, and
(C) a solvent,
wherein
(A) the resin comprises a functional group I which is one or more groups selected from the group consisting of a hydroxyl group, a cyano group, and a carboxyl group, and a functional group II being a hydrophilic group other than the functional group I, or
(A) the resin comprises a functional group II being a hydrophilic group comprising one or more groups selected from a hydroxyl group, a cyano group, and a carboxyl group,
wherein (A) the resin has a weight-average molecular weight of 100,000 or more, and wherein the hydrophilic group of the functional group II comprises no polyoxyalkylene group,
(A) the resin consists of a constituent unit derived from a monomer represented by the following formula (A5) and a constituent unit other than the constituent unit derived from the monomer represented by the formula (A5):

$$CH_2=CR^2-CO-NH-R^1 \quad (A5)$$

wherein in the formula (A5), le is an alkyl group having 1 to 4 carbon atoms substituted with one or more groups selected from the group consisting of an amino group, a sulfonic acid group, and a hydroxyl group, or a hydrogen atom; and $R^2$ is a hydrogen atom or a methyl group.

6. A method of using the surface treatment liquid according to claim 5, for suppressing adsorption of protein onto a surface of a treatment target.

7. A method of using the surface treatment liquid according to claim 5, for suppressing adhesion of cells on a surface of a treatment target.

8. A surface treatment method comprising applying the surface treatment liquid according to claim 5 to the surface of a treatment target.

9. The surface treatment method according to claim 8, wherein the method comprises rinsing a portion of the treatment target to which the surface treatment liquid is applied.

10. The surface treatment method according to claim 8, wherein the treatment target is a substrate, the applying of the surface treatment liquid is carried out by spin coating.

11. The surface treatment method according to claim 8, wherein material on the surface to which the surface treatment liquid is to be applied is an organic material, (A) the resin has at least one of a hydroxyl group and a carboxyl group, as the functional group I.

12. The surface treatment method according to claim 8, wherein material on the surface to which the surface treatment liquid is to be applied is an inorganic material, (A) the resin has at least one of a hydroxyl group and a cyano group, as the functional group I.

13. The surface treatment method according to claim 8, wherein protein adsorption on the surface of the treatment target is suppressed using the surface treatment liquid.

14. The surface treatment method according to claim 8, wherein the cell adhesion on the surface of the treatment target is suppressed using the surface treatment liquid.

15. The surface treatment liquid according to claim 5, wherein the constituent unit other than the constituent unit derived from the monomer represented by the formula (A5) comprises a constituent unit derived from a monomer represented by the following formula (A2):

$$CH_2=CR^2-(R^3)_a-CO-R^4 \quad (A2)$$

wherein in the formula (A2), $R^2$ is a hydrogen atom or a methyl group, $R^3$ is a divalent hydrocarbon group, a is 0 or 1, $R^4$ is $-OH$, $-O-R^5$, or $-NH-R^5$, $R^5$ is a hydrocarbon group substituted with one or more functional groups selected from the group consisting of a hydroxyl group, a cyano group, and a carboxyl group.

* * * * *